June 25, 1968  R. F. EBERLINE ET AL  3,390,291
PERMANENT MAGNET ROTOR STRUCTURE FOR
A DYNAMOELECTRIC MACHINE
Original Filed July 3, 1962  2 Sheets-Sheet 1
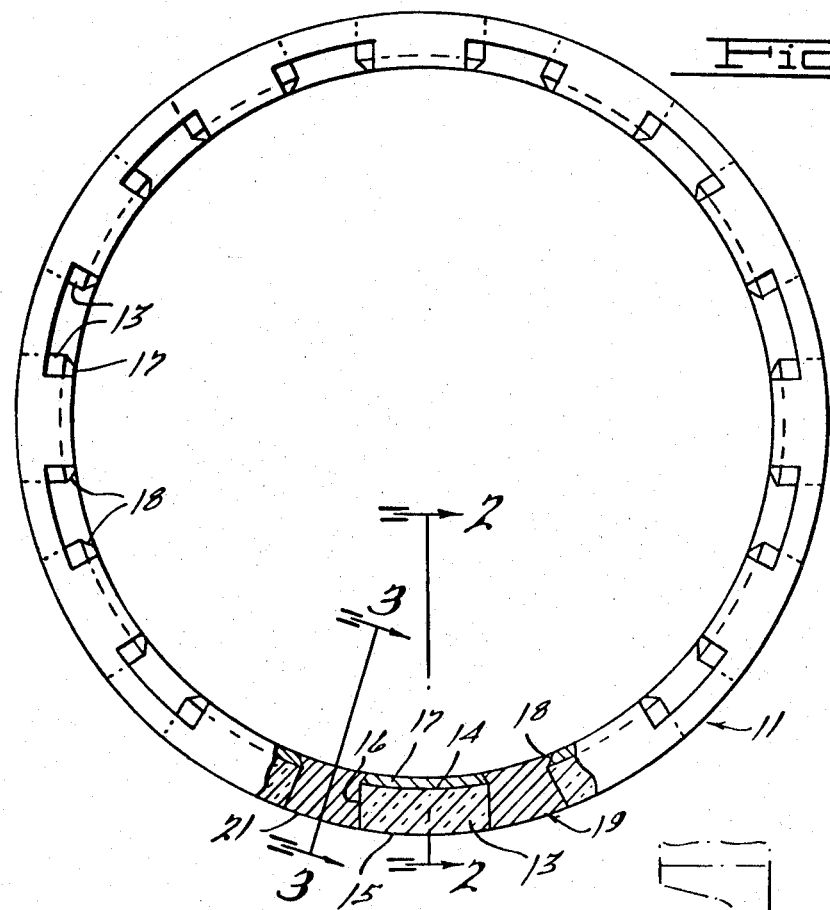
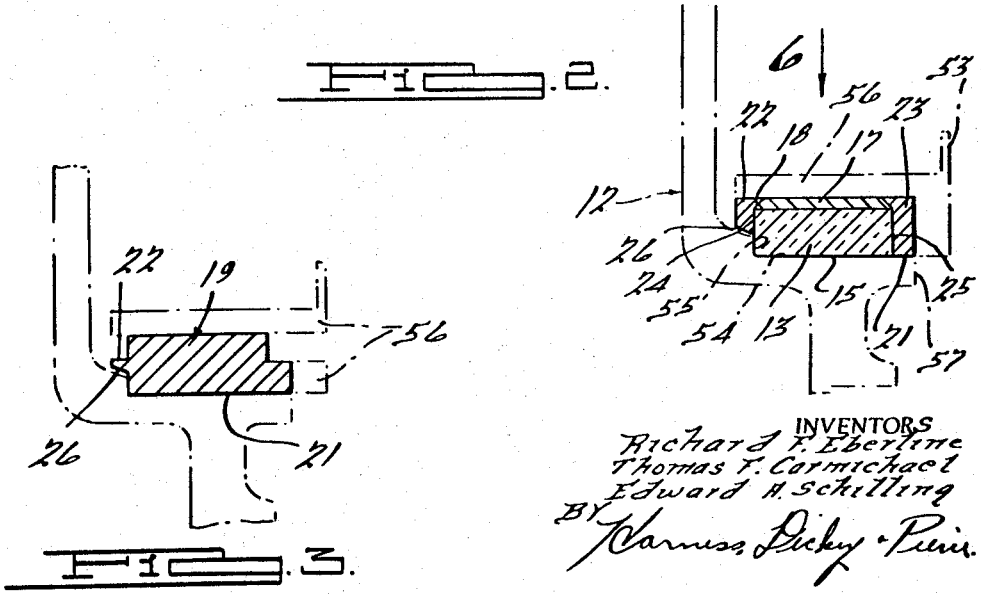
INVENTORS
Richard F. Eberline
Thomas F. Carmichael
Edward A. Schilling
BY Harness, Dickey & Pierce
ATTORNEYS INVENTORS
Richard F. Eberline
Thomas T. Carmichael
Edward A. Schilling
BY
ATTORNEYS

United States Patent Office 3,390,291
Patented June 25, 1968

3,390,291
PERMANENT MAGNET ROTOR STRUCTURE
FOR A DYNAMOELECTRIC MACHINE
Richard F. Eberline, Rochester, and Thomas F. Carmichael and Edward A. Schilling, Drayton Plains, Mich., assignors, by mesne assignments, to Michigan Bank, National Association, a national banking association
Original application July 3, 1962, Ser. No. 207,264, now Patent No. 3,368,275, dated Feb. 13, 1968. Divided and this application Sept. 28, 1967, Ser. No. 671,252
10 Claims. (Cl. 310—156)

ABSTRACT OF THE DISCLOSURE

A permanent magnet rotor structure for a dynamo electric machine utilizing a separate unit holding a cluster of permanent magnets and a supporting ring for supporting the separate unit with the supporting ring being a pre-existing component serving a function in a machine assembly, other than as a part of a generator, in which it is adapted to be rotated.

---

The present application is a divisional of our copending patent application Ser. No. 207,264, filed July 3, 1962, now Patent No. 3,368,275, issued Feb. 13, 1968, to Richard F. Eberline et al. for Generator and Method of Manufacture.

This invention relates to generators, and more particularly to a construction for permanent magnet alternators of the type having a rotor ring carrying circumferentially spaced permanent magnets of the ceramic type.

The use of ceramic type permanent magnets for the outside rotors of permanent magnet alternators has certain advantages, among which is the fact that a predetermined amount of induction can be obtained with ceramic magnets which are shorter in a radial direction as compared with Alnico magnets. However, in order to achieve the desired flux concentration, metallic shoes are placed on the inner surfaces of the ceramic magnets facing the stator.

It is an object of the present invention to provide a novel and improved construction for permanent magnet alternator rotors in which ceramic magnets and their associated metallic shoes will be rigidly secured in a unitary arrangement, facilitating their assembly in an outer support, such as a flywheel or ring gear unit.

It is a general object to provide an improved rotor construction for a generator.

Other objects, features, and advantages of the present invention will become apparent from the subsequent description, taken in conjunction with the accompanying drawings, in which:

FIGURE 1 is a partly sectioned plan view of the magnet and shoe assembly after casting and machining but before it is placed in a ring support;

FIGURE 2 is a cross-sectional view taken along the line 2—2 of FIGURE 1 and showing the assembly mounted in a support ring;

FIGURE 3 is a cross-sectional view taken along the line 3—3 of FIGURE 1 and showing the shape of the casting between magnets;

Figure 4:
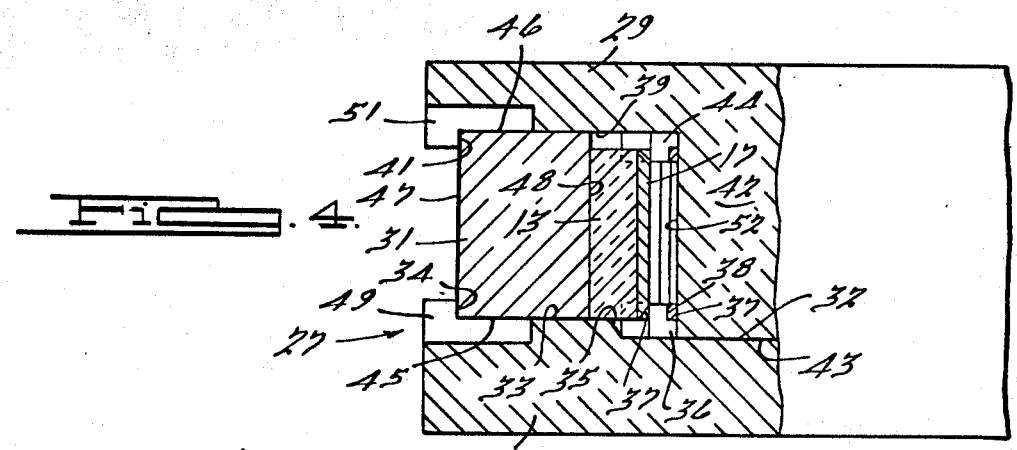
FIGURE 4 is a partial cross-sectional view in elevation of a suitable die assembly for molding the magnet-supporting casting, showing the magnets and shoes in position.

Briefly, the illustrated embodiment of the invention comprises a plurality of circumferentially spaced curved ceramic magnets, each having a relatively thin metallic shoe engaging its concave surface, with a cast ring of nonmagnetic material engaging and partially surrounding the magnets, the ring serving to support the magnets and shoes and permitting them to be assembled as a unit into a supporting ring of magnetic material which engages the magnets. One great advantage of the present invention is the use, as noted in the objects, of the unit, i.e., cast ring, magnets, etc., in combination with a pre-existing component, such as a fly-wheel, ring gear, etc., to define the supporting ring of magnetic material. Note that the flywheel or the like is a pre-existing component normally serving a first function in a machine assembly other than a function as a portion of a generator and in such first function is adapted to be rotated. Thus the pre-existing component provides the rotational force to the generator, provides a magnetic return path for the magnets, acts as a support for the unit and still performs its original function i.e. flywheel or gear, etc.

As a suitable process for making the magnet and shoe assembly, a multiple member die or mold is provided, the magnets being positioned together with the shoes within the die while in a magnetized condition, the die members being provided with locating and supporting elements for the magnets and shoes. After the casting is formed the magnets are demagnetized, after which the unitary magnet and shoe assembly is placed in the supporting ring, the ring being previously heated so that it will shrink into tight engagement with the assembly. The cast ring is then machined at room temperature to remove its interior sufficiently to expose the magnet shoes, and the magnets are then remagnetized.

Referring more particularly to the drawings, FIGURES 1, 2 and 3 show the magnet and shoe assembly which is generally indicated at 11 and is intended to be mounted in a supporting ring of magnetic material generally indicated at 12 and shown partially in dot-dash lines in FIGURES 2 and 3 and as previously noted the supporting ring is advantageously a pre-existing component such as a flywheel, ring gear, etc. In its finished form, assembly 11 comprises a plurality of circumferentially spaced ceramic magnets 13 which may be fabricated by any of several known methods. Each magnet 13 has a concave inner surface 14 and a convex outer surface 15, these surfaces being concentric and being connected by parallel sides 16. Each magnet is provided with a shoe 17 of magnetic material, the width and length of this shoe being substantially the same as the width and length of magnet surface 14, the shoe having concentric concave and convex surfaces with the convex surface being complementary to surface 14. The edges 18 of shoes 17 are beveled as shown in the figures, the bevel being in an inward direction from the convex surface to the concave surface.

An annular casting of nonmagnetic material generally indicated at 19 holds magnets 13 and shoes 14 together. Cast ring 19 is somewhat wider than magnets 13, as seen in FIGURE 2. The outer convex surface 21 of ring 19 is on the same diameter as the convex surfaces 15 of magnets 13, that is, surfaces 15 and 21 are flush or contiguous. At the location of magnets 13, surface 21 is relatively narrow, as seen in FIGURE 2, whereas surface 21 is relatively wide between magnets 13, as seen in FIGURE 3.

The thickness of ring 19 in its final form is equal to the combined thicknesses of magnets 13 and shoes 17, as seen in FIGURE 2, and the width of ring 19 is somewhat greater than the width of magnets 13 and shoes 17. The ring is thus formed with portions 22 and 23 which engage the axially spaced end surfaces 24 and 25, respectively, of magnets 13 and the end bevel edges 18 of shoes 17, portions 22 and 23 of ring 19 holding shoes 17 against magnets 13. If ring 19 is fabricated in accordance with the method to be described below, portions 22 and 23 will be partially removed in the areas between magnets, as seen in FIGURE 3. The inner surfaces of portions 22 and 23 adjacent shoes 17 will be flush with the inner shoe surfaces, as will be noted in FIGURE 2. Portion 23 of ring 19 extends radially outwardly to surface 21, whereas portion 22 extends outwardly a lesser distance, terminating in an inclined or frustoconical surface 26. The axially spaced outer surfaces of ring portions 22 and 23 are parallel to magnet surfaces 24 and 25.

Figure 5:
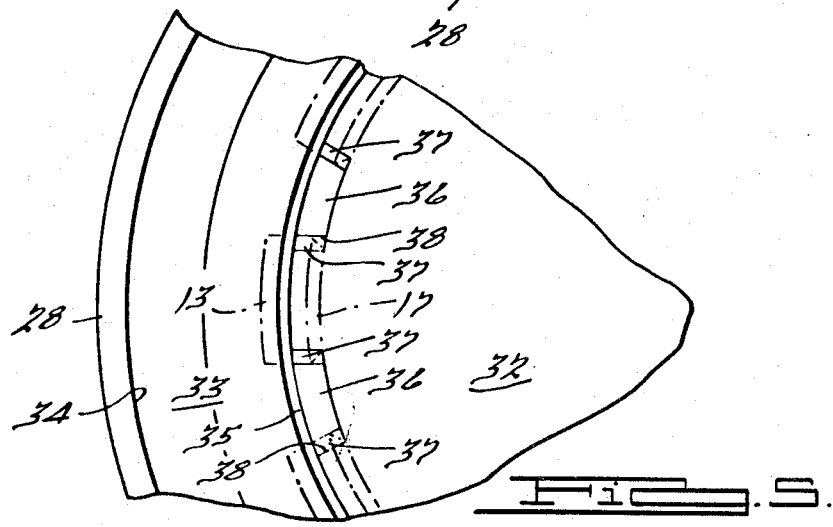
FIGURE 5 is a fragmentary plan view of the lower die member, showing magnet-supporting and positioning elements.
Figure 6:
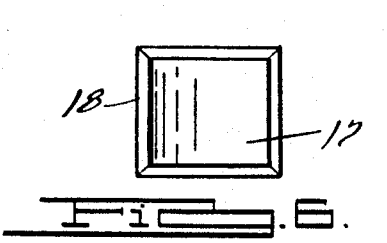
FIGURE 6 is a front view of one of the magnet shoes.

FIGURES 4 and 5 illustrate a mold or die construction for forming assembly 19. The mold or die assembly is generally indicated at 27 and comprises a lower die member 28, an upper die member 29 and an intermediate die member 31. These die members are suitably fabricated of magnetic material such as steel and are of circular shape, member 28 having an upwardly facing flat central surface 32, a flat surface 33 outwardly of surface 32 and spaced thereabove, and an outer retaining shoulder 34 for intermediate die member 31. Surfaces 32 and 33 are connected by an inclined or frustoconical surface 35 which serves to form ring surface 26. A plurality of circumferentially spaced magnet and shoe supporting elements 36 extending upwardly from surface 32 immediately inwardly of surface 35. Each element 36 comprises a flat-topped projection extending upwardly somewhat higher than the level of surface 33 but with a pair of end surfaces 37 which are flush or contiguous with surface 33 as seen in FIGURE 5, thus forming vertical shoulders 38. The spacing between shoulders 38 of adjacent elements 36 is equal to the length of each magnet 13 in a circumferential direction so that a magnet 13 and a shoe 17 may be retained between each adjacent pair of elements 36, as seen in phantom lines in FIGURE 5.

Upper die member 29 has an inner downwardly facing flat annular surface 39 which terminates at a shoulder 41 having the same diameter as shoulder 34. A downward extension 42 is centrally formed within surface 39, this extension terminating in a lower flat surface 43 engageable with surface 32. The total length of extension 42 is such that the distance between surfaces 32 and 39 will be equal to the desired initial thickness of ring 19; this will be determined by the width of magnets 13 and shoes 17 in an axial direction. A plurality of circumferentially spaced downward projections 44 are provided on surface 39; these projections are shaped similarly to projection 36 so as to be in supporting relation with magnets 13 and shoes 17.

Intermediate die member 31 is of annular shape, having a lower flat surface 45 engageable with surface 33 of die member 28 and an upper flat surface 46 engageable with surface 39 of die member 29. The distance between surfaces 45 and 46 will likewise be determined by the width of magnets 13 and shoes 17. Outer surface 47 of die member 31 is substantially the same as the diameter of shoulders 34 and 41, and the thickness of die member 31 is such that its inner surface 48 will be in supporting relation with the outer surfaces 15 of magnets 13. A plurality of recesses 49 and 51 may be provided in die members 28 and 29, respectively, for separating purposes. It should be noted that the cylindrical surface 52 of extension 42 is spaced inwardly from surface 48 a distance such that a space will exist between the concave surfaces of shoes 17 and die surface 52.

In carrying out the novel process of fabricating assembly 11, central die member 31 will be mounted on lower die member 28 and magnets 13 in their magnetized condition, together with shoes 17, will be placed with proper polar orientation between shoulders 38 on lower die member 28, the magnets resting on surfaces 37 of projections 36 and die surface 33, shoes 17 being supported by surfaces 37. Because of the magnetized condition of magnets 13, their outer convex surfaces will be held firmly against intermediate die member 31, and their inner concave surfaces will hold shoes 17. Glue or other adhesive material may be used between magnets 13 and shoes 17 for aiding in retention of the shoes on the magnets. Upper die member 29 will then be mounted on intermediate die member 31, projections 44 engaging the upper portions of magnets 13 and shoes 17 while surface 43 of upper die member 29 engages surface 32 of lower die member 28.

The molten material which will form ring 19 is then poured or injected into the cavity formed by the die members through a suitable gate (not shown). This material may be aluminum, zinc, bismuth or another nonmagnetic metallic or plastic substance having the desired strength characteristics. Heat from the material forced into the mold will at least partially demagnetize magnets 31, thus facilitating removal of assembly 11 from mold 27.

The gate and the sprue formed between surfaces 32 and 43 will then be removed, the sprue being indicated in dot-dash lines at 53 in FIGURE 2. Magnets 13 will then be demagnetized, this being done to facilitate the later machining step.

Assembly 11 may then be mounted in supporting ring 12. The ring is shown in FIGURE 2 as having an annular surface 54 for supporting assembly 11, this surface terminating in an inwardly extending shoulder 55. Ring 12 may be previously heated and assembly 11 slipped into the ring, portion 22 first, until it engages shoulder 55; an appropriate lubricating substance may be used for this purpose if desired. As ring 12 cools, it will shrink into tight engagement with assembly 11, being in direct contact with exposed convex surfaces 15 of magnets 13 to form an efficient flux path.

The assembly comprising unit 11 and ring 12 may then be machined at room temperature to remove the excess portions of casting 19. These excess portions are indicated in dot-dash lines at 56 in FIGURES 2 and 3 and will comprise the material radially inwardly of inner shoe surfaces 17 and axially outwardly of the end surface 57 of supporting ring 12. Magnets 13 may then be remagnetized to complete the fabrication process. In the case where supporting ring 12 is most advantageously selected to be a pre-existing component such as a flywheel, ring gear, etc., the rotor of the generator is defined by an assembly including a component which is in accordance with its first function adapted to be rotated with the component also acting as a support while providing the return magnetic path for the magnets 13. Thus with this construction, the need for a separate drive for the rotor is eliminated.

Figure 7:
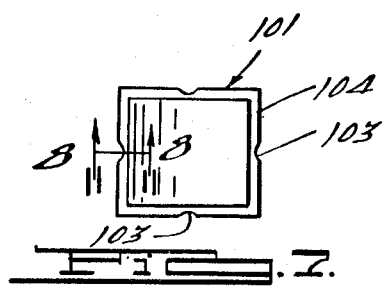
FIGURE 7 is a front view of a modified form of magnet shoe in which edge portions are crimped around the ceramic magnet.
Figure 8:
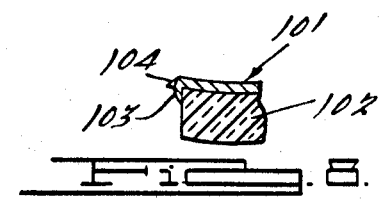
FIGURE 8 is a cross-sectional fragmentary view taken along the line 8—8 of FIGURE 7 and showing the manner in which the shoe portions engage the magnet.

FIGURES 7 and 8 show a slightly modified form of the magnet shoe, the shoe being indicated generally at 101. Shoe 101 is generally similar to shoe 17, having convex and concave surfaces with the convex surface complementary to the concave surface of magnet 102. However, the outer dimensions of shoe 101 are slightly larger than those of magnet 102, so that portions 103 of beveled edge 104 may be formed into coined or lanced retention lugs for aiding in the positioning and retention of the shoes on the magnets. Four such portions 103 are shown, one being located at the central portion of each beveled edge. The use of these lugs may eliminate the need for glue or other adhesive substance during the assembly process, and portions 103 will also coact with the cast material to enhance the rigidity of the assembly.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a dynamoelectric machine, a permanent magnet rotor construction comprising an annular separate unit having a circumferentially disposed cluster of permanent magnets and a continuous ring of nonmagnetic material generally surrounding and holding said magnets, a supporting ring constructed of magnetic material and supporting said separate unit and providing a return magnetic path for said magnets, said supporting ring being a pre-existing component usually serving a first function in a machine assembly other than a function as a portion of a generator and in such first function being adapted to be rotated.

2. In the dynamoelectric machine of claim 1 said separate unit being supported on said supporting ring with a snug fit with said supporting ring in engagement with one radial side of said magnets.

3. In the dynamoelectric machine of claim 2 said separate unit having a plurality of magnet shoes in engagement with said magnets on the other radial side of said magnets with said continuous ring holding said magnets and said shoes together.

4. In the dynamoelectric machine of claim 3 said shoes having beveled edges extending radially to diverge from the outer to the inner surface of said shoes, said continuous ring having one surface flush with the outer surfaces of said shoes and having another surface flush with the exposed face of said magnets, said continuous ring engaging said beveled edges.

5. In the dynamoelectric machine of claim 4 said continuous ring being substantially wider in an axial direction than the width of said magnets and said shoes.

6. In the dynamoelectric machine of claim 5 said magnets being curved ceramic magnets having convex and concave surfaces and with said shoes having convex and concave surfaces with said magnets and said shoes having convex and concave surfaces engaging each other.

7. In the dynamoelectric machine of claim 6 the radial thickness of said continuous ring being no greater than the combined thickness of said magnets and said shoes.

8. In the dynamoelectric machine of claim 7 said supporting ring being a flywheel.

9. In the dynamoelectric machine of claim 7 said supporting ring being a ring gear.

10. In the dynamoelectric machine of claim 7 said continuous ring being a member cast about said magnets and said shoes.

References Cited

UNITED STATES PATENTS

| | | | |
|---|---|---|---|
| 2,930,916 | 3/1960 | Scanlon et al. | 310—156 |
| 3,072,813 | 1/1963 | Reijnst et al. | 310—156 |
| 3,132,270 | 5/1964 | Phelon | 310—156 |
| 3,237,034 | 2/1966 | Krasnow | 310—156 |

MILTON O. HIRSHFIELD, *Primary Examiner.*

L. L. SMITH, *Assistant Examiner.*